(12) United States Patent
Wu et al.

(10) Patent No.: US 6,272,412 B1
(45) Date of Patent: Aug. 7, 2001

(54) PASSIVE RESTRAINT CONTROL SYSTEM FOR VEHICLES

(75) Inventors: Chi-Chin Wu, W. Bloomfield; James C. Cheng, Troy; Jialiang Le, Pittsfield Township; Mark Anthony Cuddihy, New Boston, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/188,093

(22) Filed: Nov. 9, 1998

(51) Int. Cl.[7] .................................................... G06G 7/76
(52) U.S. Cl. ................................ 701/47; 701/45; 701/46
(58) Field of Search ................................ 701/45, 46, 47; 180/271, 272; 280/735, 734

(56) References Cited

U.S. PATENT DOCUMENTS

| | | | |
|---|---|---|---|
| 4,784,237 | * 11/1988 | Condne et al. | 180/268 |
| 5,034,891 | 7/1991 | Blackburn et al. | 701/47 |
| 5,036,467 | 7/1991 | Blackburn et al. | 701/47 |
| 5,065,322 | 11/1991 | Mazur et al. | 701/47 |
| 5,067,745 | 11/1991 | Yoshikawa | 208/735 |
| 5,073,860 | 12/1991 | Blackburn et al. | 701/47 |
| 5,109,341 | 4/1992 | Blackburn et al. | 701/47 |
| 5,189,311 | 2/1993 | Moriyama et al. | 307/10.1 |
| 5,256,904 | * 10/1993 | Tohbaru | 307/10.1 |
| 5,309,138 | * 5/1994 | Tohbaru | 340/436 |
| 5,396,424 | 3/1995 | Moriyama et al. | 701/46 |
| 5,402,343 | 3/1995 | Shibata et al. | 701/46 |
| 5,430,649 | * 7/1995 | Cahler et al. | 364/424.05 |
| 5,431,441 | 7/1995 | Okano | 280/735 |
| 5,435,184 | 7/1995 | Pineroli et al. | 73/489 |
| 5,436,838 | 7/1995 | Miyamori | 701/46 |
| 5,445,413 | 8/1995 | Rudolf et al. | 280/735 |
| 5,483,449 | 1/1996 | Caruso et al. | 701/46 |
| 5,608,629 | * 3/1997 | Cuddihy et al. | 701/1 |
| 5,667,244 | 9/1997 | Ito et al. | 280/735 |
| 5,758,301 | 5/1998 | Saito et al. | 701/45 |
| 5,801,619 | * 9/1998 | Liu et al. | 340/436 |

FOREIGN PATENT DOCUMENTS 0-517-253-A1   6/1992   (EP) .

* cited by examiner

*Primary Examiner*—William A. Cuchlinski, Jr.
*Assistant Examiner*—Marthe Y. Marc-Coleman
(74) *Attorney, Agent, or Firm*—Donald A. Wilkinson

(57) ABSTRACT

An impact system employs an accelerometer (40), which produces an acceleration signal (70), and communicates it with a restraints control module (38) that, in turn, determines when switches (58) for passive restraint actuation will be activated. The restraints control module (38) decomposes the acceleration signal (70) via low (44) and high (46) pass filters into a high frequency signal (74), which is used for impact mode determination (78), and a low frequency signal (76), which is used for impact severity determination (80). The results of the two determinations are then used to make a deployment decision (82) for one or more of the passive restraints (30, 32, 34) in the vehicle (20).

18 Claims, 3 Drawing Sheets

PASSIVE RESTRAINT CONTROL SYSTEM FOR VEHICLES

FIELD OF THE INVENTION

The present Invention relates to controls for determining deployment of passive restraints in passenger vehicles and more particularly relates to distinguishing different types and severities of impact events to improve passive restraint deployment decisions.

BACKGROUND OF THE INVENTION

For vehicles that include passive restraint systems, it is important to be able to determine when an impact event is serious enough to warrant deployment of one or more of these passive restraints in order to protect the vehicle occupants. These may take the form of front airbags, side airbags, seat belt pretensioners, etc. Likewise it is also important to determine when an impact event does not warrant deployment to avoid unnecessary use of the passive restraints, in order to avoid replacement expenses or risks to the vehicle occupants. Additionally, the deployment decision must be accomplished a very short time after vehicle impact. This is preferably accomplished while minimizing the expense of the system.

One current system for determining vehicle impacts involves the use of a single point acceleration sensor connected to a central processor that evaluates the acceleration signal. It is more cost effective than other types of impact sensing in that it generally only requires one sensor, but it must infer the type and severity of impact being detected in order to accurately and quickly make a deployment decision for the passive restraints. The manipulation and calculations made with the acceleration signal then, are key to an accurate deployment decision early in an impact event.

In many applications of the single accelerometer type of system, then, an approach is employed where the integral or energy contribution in a velocity change based calculation is the basis for the actuation decision. Since the energy contribution is largely determined by the low frequency portion of an acceleration signal, the high frequencies are filtered out and ignored. This type of strategy, however, while being able to determine the severity of the impact, will make deployment decision without distinguishing very well between different types of impacts, which may have different deployment decisions for different levels of energy involved in the impact, given the short time frame in which the decision must be made.

It is thus desirable to be able to employ an accelerometer based impact detection and passive restraint deployment system with improved accuracy in the deployment decision.

Also, when one is adapting the particular sensing system for a new vehicle it is preferable to minimize development time and expense by being able to employ non-destructive testing to determine the deployment thresholds for various types of vehicle impacts.

SUMMARY OF THE INVENTION

In its embodiments, the present invention contemplates a method of determining passive restraint deployment for a vehicle having an accelerometer mounted therein comprising the steps of: generating an acceleration signal from the accelerometer; high pass filtering the acceleration signal into an impact mode signal in a high frequency range; low pass filtering the acceleration signal into an impact severity signal in a low frequency range; comparing the impact mode signal to a predetermined impact mode threshold; comparing the impact severity signal to a predetermined impact severity threshold; and sending a deployment signal if both the impact mode threshold and the impact severity threshold are exceeded.

The present invention further contemplates a system for determining the deployment of passive restraints on a vehicle having a single point impact sensor. The system includes an accelerometer mounted within the vehicle for producing an acceleration signal, a high pass filter for receiving and filtering the acceleration signal to produce an impact mode signal, and a low pass filter for receiving and filtering the acceleration signal to produce an impact severity signal. The system also includes first means for receiving the impact mode signal and determining the impact mode, second means for receiving the impact severity signal and determining the impact severity, and deployment means for making a deployment decision based on the impact mode and the impact severity.

Accordingly, an object of the present invention is to decompose an accelerometer signal into low and high frequencies, using the high frequency portion of the signal to identify the impact mode and location, and the low frequency portion of the signal to identify the impact severity, then taking both into account when making a deployment decision.

An advantage of the present invention is that a more accurate determination can be made as to passive restraint actuation by taking into account the impact mode and location when comparing the impact severity determination to a passive restraint actuation threshold.

A further advantage of the present invention is that an accurate deployment decision can be made while maintaining minimum expense and complexity in the sensing and deployment system.

Another advantage of the present invention is that the impact sensing system can be developed for a particular model of vehicle with non-destructive testing, thus reducing the time and expense needed to adapt the system to a new vehicle.

DETAILED DESCRIPTION OF THE PREFERRED EMBODIMENTS

Figure 1:
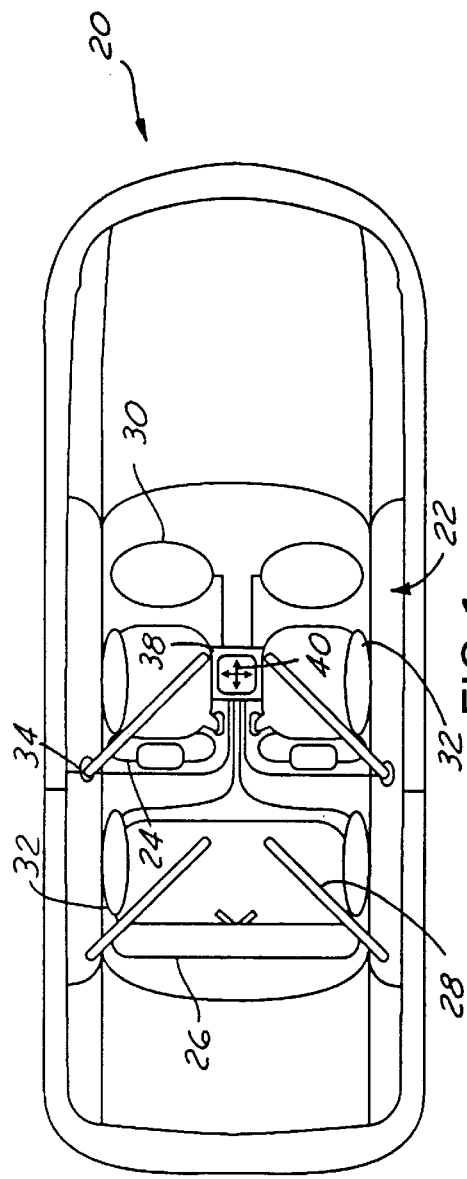
FIG. 1 is a schematic plan view of a vehicle in accordance with the present invention.

FIG. 1 illustrates a vehicle 20 including a passenger compartment 22 having front 24 and rear 26 seats therein. Each of the seats includes a seat belt 28. In front of the front seats 24 are front airbags 30 and adjacent the sides of the front 24 and rear 26 seats are side airbags 32. Also, seat belt pretensioners 34 engage the seat belts. While three different types of passive restraint devices, i.e., front airbags 30, side airbags 32 and seat belt pretensioners 34, are illustrated herein, there may only be one or two of these types of passive restraints on a given vehicle. The present invention is able to be applied to any of these passive restraints.

Also mounted within the vehicle is a restraints control module 38 and at least one accelerometer 40. The accelerometer 40 may be a dual axis accelerometer, as is illustrated, or one or more single axis accelerometers, depending upon the particular passive restraints employed in the particular vehicle. The dual axis accelerometer 40 includes the capability to sense longitudinal (fore-aft) acceleration of the vehicle for frontal impact situations and supply a signal indicating such to the restraints control module 38, and the capability to sense side-to-side acceleration of the vehicle for side impact situations and supply a different signal indicating such to the restraints control module 38. In any event, the accelerometer 40 will supply a signal indicative of the acceleration of the vehicle, so for purposes of the following discussion, longitudinal acceleration and frontal impact events will be discussed, although this is equally applicable to side impact situations.

Figure 2:
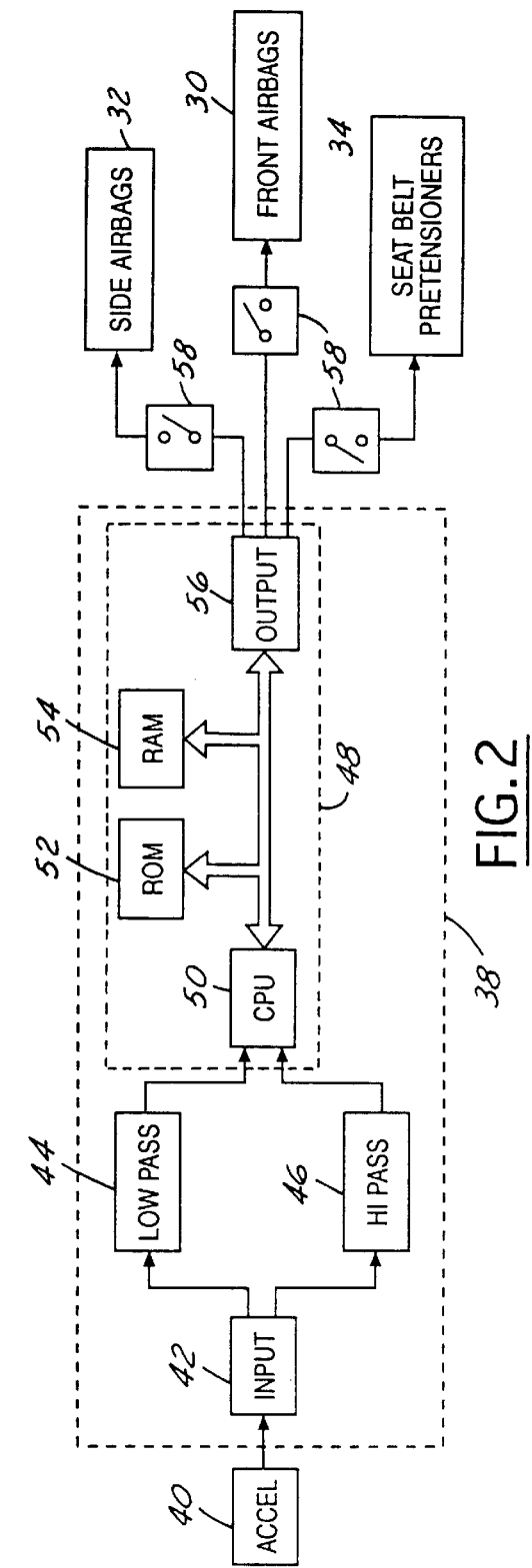
FIG. 2 is a schematic view of the electronics of the present invention.

FIG. 2 illustrates a schematic diagram of the electronics involved in discrimination of impact events and passive restraints deployment decisions. The accelerometer 40 is electrically connected to an input port 42 in the restraints control module 38. The input port 42 connects to a low pass filter 44 and a high pass filter 46 in parallel. The filters 44 and 46 may be analog filters, or may be digital filters in which case an analog to digital converter will convert the accelerometer signal prior to entering the filters.

Both filters 44, 46 are connected to a microcomputer portion 48 of the restraints control module 38 constituted in a conventional manner, including a central processing unit 50, read only memory 52, random access memory 54, and an output port 56, all connected through a common bus. The output port 56 is connected to passive restraints deployment switches 58, which are in turn connected to the passive restraints, namely, front airbags 30, side airbags 32, and seat belt pretentioners 34.

Figure 3:
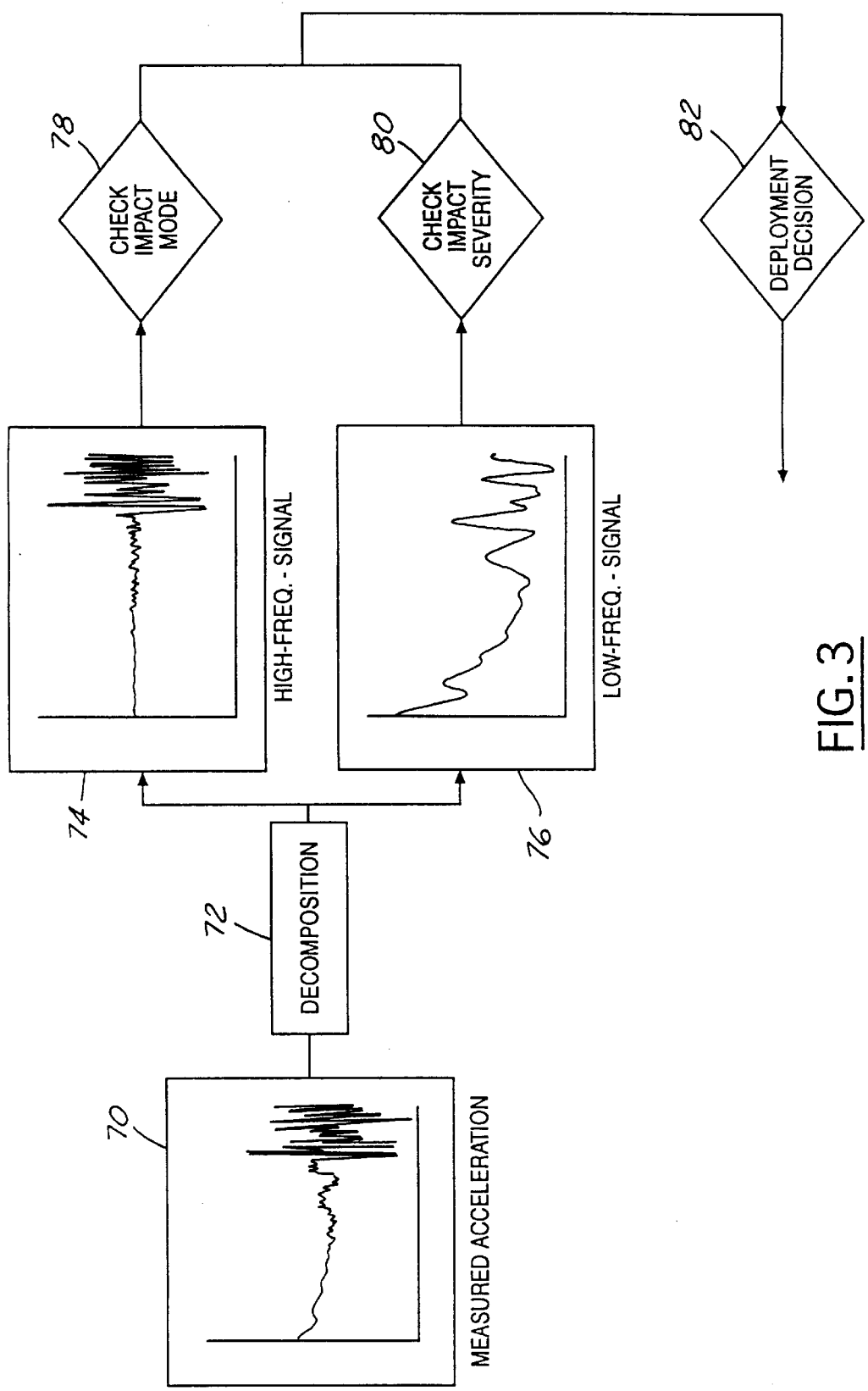
FIG. 3 is a flow chart for the process of the present invention.

FIG. 3 is a flow chart of the process for determining deployment, illustrating example signals for the front of a vehicle impacting a fixed barrier. The accelerometer produces an acceleration signal, block 70. The vertical axis in this block represents measured acceleration values and the horizontal axis represents time from impact. The acceleration signal is then decomposed in real time, block 72. This results in a high frequency signal, block 74, and a low frequency signal, block 76. The high frequency signal is, for example, above about 100 hertz, and the low frequency signal is, for example, below about 100 hertz, although this may vary for the particular vehicle in which the present invention is employed.

By separating the signal into these two components, manipulation of the original signal is allowed that will produce more information about the impact itself. The signal produced by the accelerometer contains two kinds of wave characteristics. The wave characteristics from the high frequency portion result from an elastic shock wave emanating from the impact location. By determining the arrival time of this portion of the signal at the sensor location, in addition to the shape of the wave, one can determine the mode and location of the impact event. This portion of the signal from the accelerometer, then, is important, even though it is a poor indicator of the energy involved with the impact.

On the other hand, the low frequency portion of the acceleration signal produces a signal resulting from an inelastic wave. This portion of the signal can be integrated to produce a velocity change based calculation, indicating the permanent damage to the vehicle as a result of the energy involved in the impact. This portion of the acceleration signal, then, will give a very good indication as to the severity of the impact event.

Consequently, as is shown in FIG. 3, the high frequency signal is then interpreted through an impact mode check, block 78, by comparing features of the high frequency signal to high frequency features associated with known modes of impact. These modes may be a pole impact, a rigid barrier impact, an offset impact into a rigid barrier, a car-to-car impact, etc.

The low frequency signal is also interpreted, through an impact severity check, block 80, which will determine the amount of energy associated with the impact, regardless of the mode of the impact. The results of the impact mode check and the impact severity check are then employed to make a passive restraint deployment decision, block 82.

The deployment decision will take into account both sets of information. For example, one way to account for both sets of information is that one determines the impact :ode and uses this to adjust the impact severity threshold. By knowing the impact mode, then a particular energy threshold for that mode will be compared to the energy calculated from the impact severity check. If the threshold for that impact mode is exceeded, then a passive restraint actuation signal will be sent. In this way, different impact modes will have different thresholds for energy levels, allowing for an improved actuation decision, while still making the decision in a minimal amount of time. The information concerning the impact mode and impact severity can also be combined in other ways, if so desired, to make a deployment decision.

Figure 4:
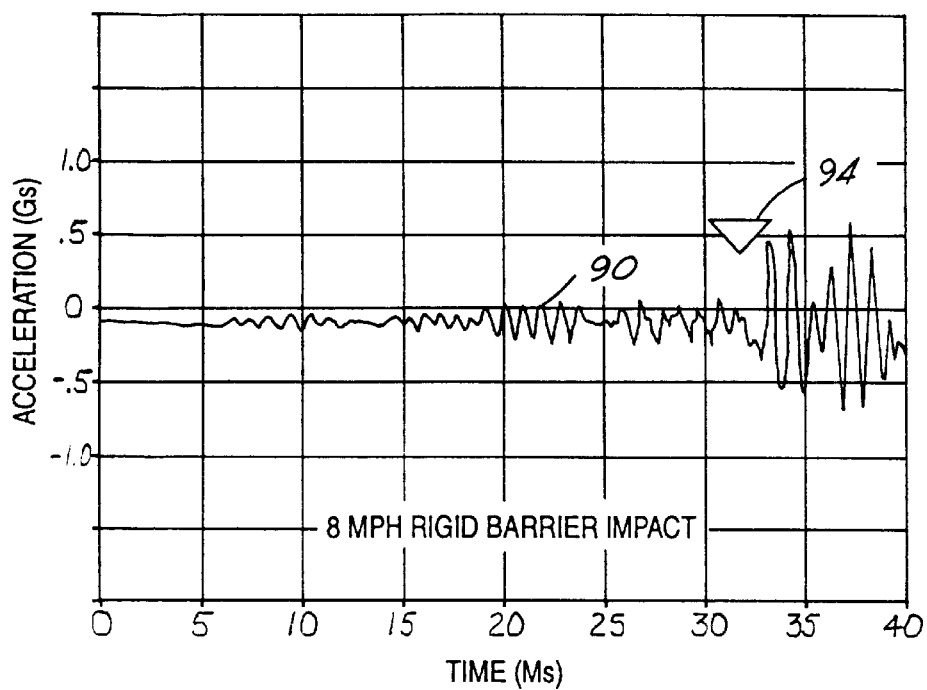
FIG. 4 is an example of a high frequency portion of an acceleration signal for a rigid barrier impact event.
Figure 5:
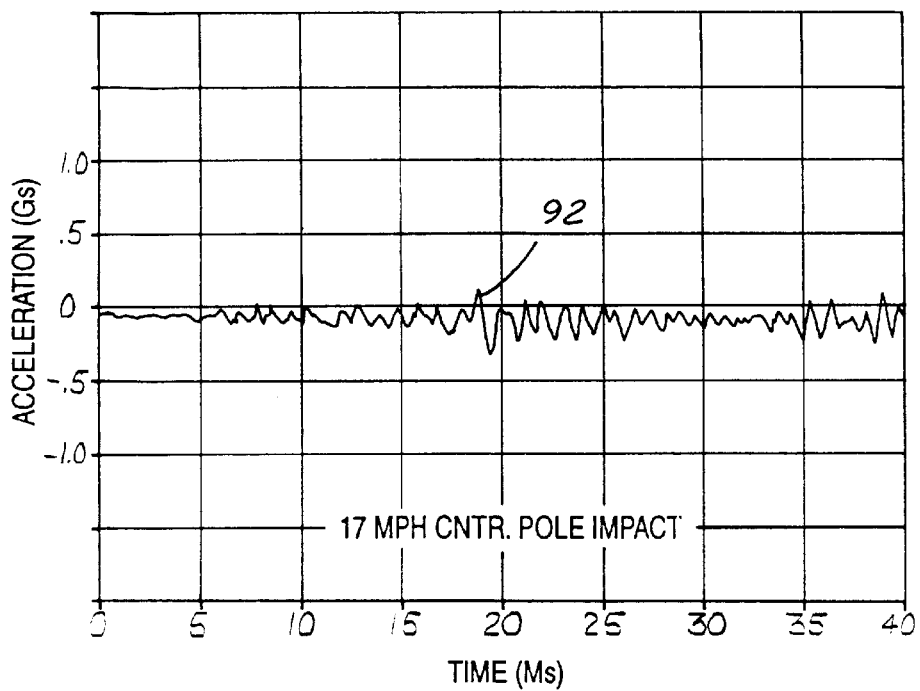
FIG. 5 is an example of a high frequency portion of an acceleration signal for a center pole impact event.

FIGS. 4 and 5 illustrate two examples of high frequency portions of accelerometer signals for different vehicle impact modes. FIG. 4 is a signal 90 from an eight mile per hour frontal impact of a passenger car into a rigid barrier, while FIG. 5 is a signal 92 from a seventeen mile per hour frontal impact of the front-center of a passenger car into a pole. One will note the significant differences in the amplitudes of the high frequency signals. Also, one will note in FIG. 4 the arrival time for the elastic portion of the signal to reach the sensor location, indicated by an arrowhead 94.

These differences between various impact modes can be identified, even if the low frequency signal were to indicate similar energy absorption early in the impact event, thus improving the actuation decision.

Another advantage of the present invention is that, by employing these particular separate signals for deployment decisions, non-destructive testing is possible for adapting the system to a new model of vehicle, while still maintaining good accuracy in the deployment decisions.

For the high frequency, elastic shock wave portion of the acceleration signal, the sensor system can be calibrated for a particular model of vehicle by a non-destructive hammer test. This is done by impacting a vehicle at a given location with a bunt object and measuring the time for the wave to reach the sensor as well as the amplitudes of the initial pulse. One can then calibrate the software in the control module to recognize the signal for that location. The blunt object impact can be small enough to avoid permanent damage to the impact location. Further, the low frequency thresholds may be determined with computer aided engineering impact simulations on computer models of the particular model of vehicle to estimate energy levels. Computer simulation can be used since only impact severity needs to be determined and not greater details as to the character of the signal, since this is accomplished by the high frequency signal.

While certain embodiments of the present invention have been described in detail, those familiar with the art to which this invention relates will recognize various alternative designs and embodiments for practicing the invention as defined by the following claims.

We claim:

1. A method of determining passive restraint deployment for a vehicle having an accelerometer mounted therein comprising the steps of:

generating an acceleration signal from the accelerometer;

feeding the acceleration signal through a high pass filter to create an impact mode signal in a high frequency range;

feeding the acceleration signal through a low pass filter in parallel with the high pass filter to create an impact severity signal in a low frequency range;

comparing the impact mode signal to a predetermined impact mode threshold;

comparing the impact severity signal to a predetermined impact severity threshold; and sending a deployment signal only if both the impact mode threshold and the impact severity threshold are exceeded.

2. The method of claim 1 wherein the high frequency range is generally above 100 hertz.

3. The method of claim 2 wherein the low frequency range is generally below 100 hertz.

4. The method of claim 1 wherein the low frequency range is generally below 100 hertz.

5. The method of claim 1 further including the step of determining a type of impact by comparing features of the impact mode signal to high frequency features associated with a plurality of known types of impacts, prior to the step of comparing the impact mode signal to a predetermined impact mode threshold.

6. The method of claim 5 further including the step of determining a location of impact on the vehicle from the impact mode signal, prior to the step of comparing the impact mode signal to a predetermined impact mode threshold.

7. The method of claim 1 further including the step of determining a location of impact on the vehicle from the impact mode signal, prior to the step of comparing the impact mode signal to a predetermined impact mode threshold.

8. The method of claim 1 wherein the step of comparing the impact severity signal includes integrating the impact severity signal offer a predetermined time interval to produce a velocity change signal, and comparing the velocity change signal to the predetermined impact severity threshold.

9. A method of determining passive restraint deployment for a vehicle having an accelerometer mounted therein comprising the steps of: generating an acceleration signal from the accelerometer;

feeding the acceleration signal through a high pass filter to create an impact mode signal in a high frequency range; feeding the acceleration signal through a low pass filter in parallel with the high pass filter to create an impact severity signal in a low frequency range;

creating a predetermined impact severity threshold;

adjusting the impact severity threshold based upon the impact mode signal;

comparing the impact severity signal to the adjusted impact severity threshold; and sending a deployment signal if the impact severity signal exceeds the adjusted impact severity threshold.

10. The method of claim 9 wherein the high frequency range is generally above 100 hertz.

11. The method of claim 9 wherein the low frequency range is generally below 100 hertz.

12. The method of claim 9 further including the step of determining a type of impact from the impact mode signal, prior to the step of adjusting the impact severity threshold.

13. The method of claim 9 further including the step of determining a location of impact on the vehicle from the impact mode signal, prior to the step of adjusting the impact severity threshold.

14. The method of claim 9 wherein the step of comparing the impact severity signal includes integrating the impact severity signal over a predetermined time interval to produce a velocity change signal, and comparing the velocity change signal to the adjust ed impact severity threshold.

15. A system for determining the deployment of passive restraints on a vehicle having a single point impact sensor comprising:

an accelerometer mounted within the vehicle for producing an acceleration signal;

a high pass filter for receiving and filtering the acceleration signal to produce an impact mode signal;

a low pass filter in parallel with the high pass filter for receiving and filtering the acceleration signal to produce an impact severity signal; and a microcomputer operative to receive the impact mode signal and distinguish between at least two different impact modes, receive the impact severity signal and determine an impact severity being experienced by the vehicle, and make a deployment decision based on the impact mode and the impact severity.

16. The system of claim 15 further including a front airbag, and first switch means, connected between the deployment means and the front airbag, for actuating the front airbag when the deployment means indicates a positive deployment decision.

17. The system of claim 15 wherein the high pass filter is tuned to eliminate signal frequencies below about 100 hertz.

18. The system of claim 15 wherein the low pass filter is tuned to eliminate signal frequencies above about 100 hertz.

* * * * *